May 27, 1969  C. W. GOLDMAN  3,446,213
BRASSIERE

Filed March 15, 1967

INVENTOR.
CLEO W. GOLDMAN
BY
*Alfred W. Petchaft*
ATTORNEY

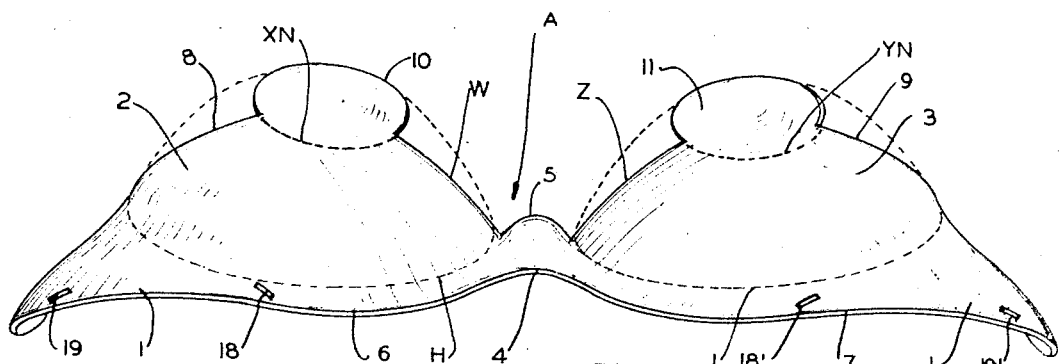
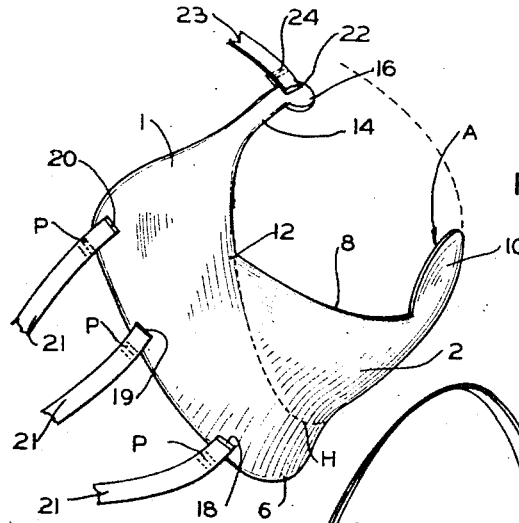
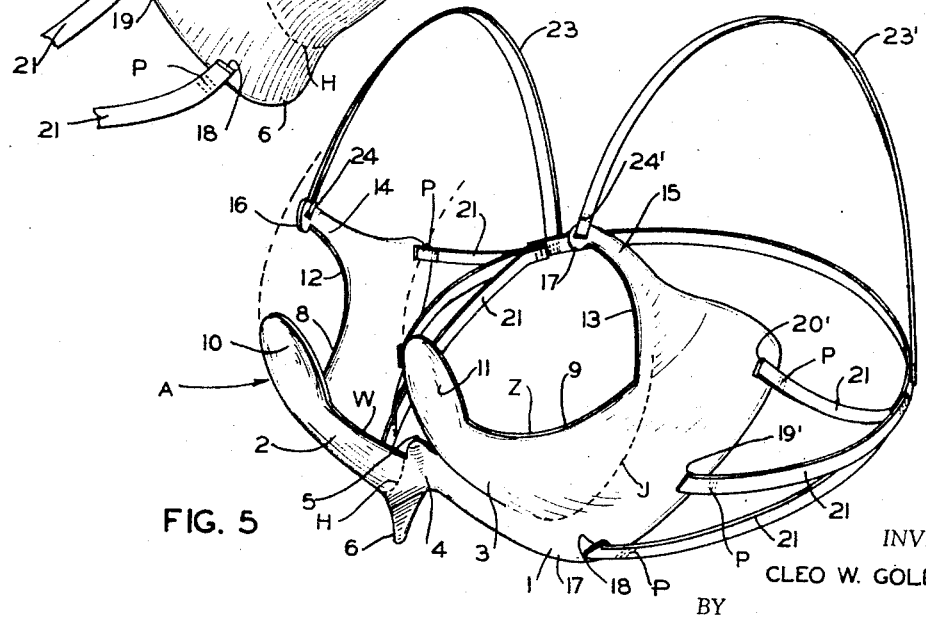
INVENTOR.
CLEO W. GOLDMAN

INVENTOR.
CLEO W. GOLDMAN

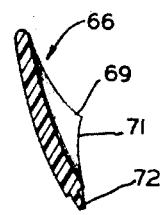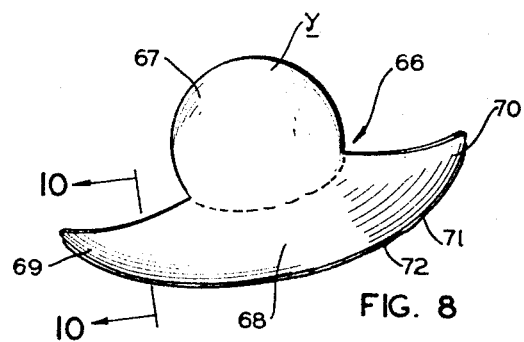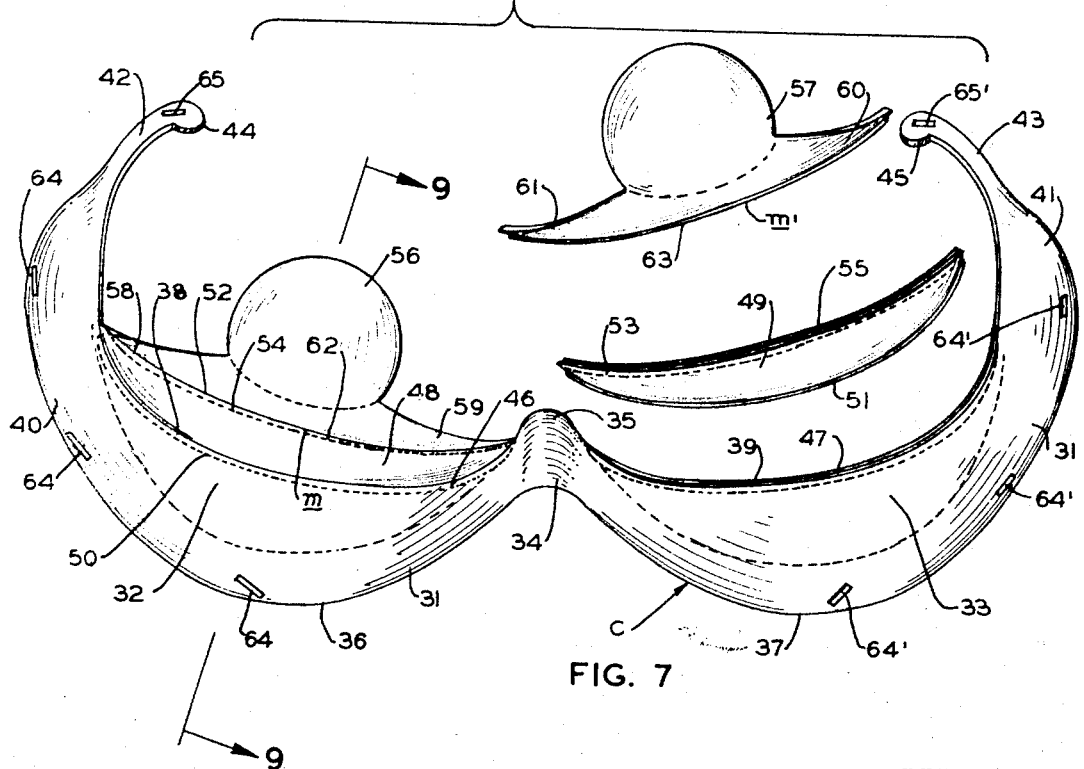
FIG. 10
FIG. 8
FIG. 7
INVENTOR.
CLEO W. GOLDMAN

INVENTOR
CLEO W. GOLDMAN
BY
ATTORNEY

INVENTOR
CLEO W. GOLDMAN
BY
ATTORNEY

United States Patent Office 3,446,213
Patented May 27, 1969

3,446,213
BRASSIERE
Cleo W. Goldman, 2517 Marigold St.,
Fort Worth, Tex. 76111
Filed Mar. 15, 1967, Ser. No. 624,664
Int. Cl. A41c 3/04, 3/06
U.S. Cl. 128—463                         21 Claims

ABSTRACT OF THE DISCLOSURE

A brassiere constructed of plastic and including a center portion and a pair of breast supporting cups. Mounted on the cups, either integrally or detachably, and projecting upwardly beyond the upper margins thereof are nipple covers. Flanges project upwardly from the extreme sides of the cups and are connected to shoulder straps at their ends.

---

This invention relates in general to brassieres and, more particularly, to a brassiere of improved shape, design, and material of construction. As used herein, the word "brassiere" refers to garments of the type conventionally used for affording support and shapeliness to the female bosom.

The brassieres in use today are commonly made of a fabric such as cotton, rayon, or nylon. There are also presently brassieres constructed with rather scanty cup portions commonly referred to as half brassieres. Moreover, such brassieres are often constructed without shoulder straps and supported mainly by a strap encircling the back portion of a woman's thorax and the woman's breasts. However, such brassieres must fit very snugly against the woman's breasts and must encircle the torso tightly which creates an undesirable condition, since many breast malignancies are caused by external irritation of this type. This tightly fitted band also eventually stretches and pulls the cups horizontally and out of shape, flattening the breasts somewhat.

It is also a common practice for many women to enhance the aesthetic value of breast appearance by stuffing or padding the cups of a brassiere. These paddings are usually made of a rather nonporous material that causes considerable perspiration around the breast tissues and often results in severe irritation. Nonporous or practically nonporous materials weaken and diminish the size of the breast tissues by causing excessive perspiration as well as producing an unhealthy suffocation effect. Moreover, such paddings are soft and resilient and do not give the desired effect and support to the breast portion. These paddings also cause the breasts to conform to the hemispherical shape and, therefore, deprive the breasts of an appealing, idealistic, and natural-like shapeliness.

Another problem exists with women who have had a mammectomy or other similar operation of the breast. All of the brassieres heretofore were not sufficiently brief in construction to avoid irritation of the very sensitive operation wound or scar tissues and yet afford sufficient support.

Among the several objects of the present invention may be noted the provision of a brassiere of improved construction affording improved means for supporting a woman's breasts, as well as to provide an improved shapeliness and fullness in the form of the tissues which eliminates the necessity of padding for aesthetic effect; the provision of a brassiere constructed of a semi-rigid synthetic resin or "plastic" material designed so as to provide a desirable degree of flexibility and still afford maximum comfort to the wearer; the provision of a brassiere constructed of a resilient yet sufficiently rigid material so that it can be molded to the exact detailed contour of a woman's body portion whereon the brassiere is worn and thereby completely eliminate the usual pulling, binding, pressing and cutting of the higher portions of the frontal rib cage area across which it is drawn by the back strap; the provision of a brassiere that will afford rigidity and strength to retain the correct shape and relationship of the breast-supporting cups and associated supporting portions of the garment while it is being worn; the provision of a brassiere which will be rigid enough to provide sufficient support and still have adequate resiliency to fit various sized women; the provision of means for lifting the heaviest or fullest (outer and lower) portion of a woman's breast higher and more inward into a more prominent position toward the nipple area; the provision of a brassiere which will brace or anchor itself upon a portion of the protruded rib cage area, substantially under the breasts, thereby securing its transversal position on the body; the provision of a brassiere which, by its structure and rigidity, will eliminate the possibility of the base portion of the brassiere from rolling upward, narrowing, by wrinkling or sliding downward, and causing the cups and breasts therein to lower from their original and proper position; the provision of a brassiere which can be worn without back or shoulder straps; the provision of a brassiere constructed of rigid synthetic resin or "plastic" material and designed so as to provide rigid, yet flexible, side supports which urge the outer breast tissues (toward the under arm) from the sides of the body to the frontal breast areas so as to attain a greater fullness in the center and frontal portion of the breast; the provision of a brassiere of the type stated that will enable the area between the cups by reason of its rigidity and its molded contour (duplicating the shape of this area of a woman's body) to hold the inner margins of the cups adjacent to the inner margins of the breasts so as to shape the breasts into a more idealistic form with the entire inner sides of the cups and to maintain proper separation of the breasts; the provision of a brassiere which will not, when shoulder straps are worn, cause a "dragging over" and "pressing downward" upon the breasts' upper portion by the pulling of the shoulder straps against the entire upper half of the cups as do conventional brassieres; the provision of a brassiere designed in a manner to take the stress off of the breast tissues not needing direct support by eliminating unnecessary coverage of the breast; and the provision of a brassiere having cups which may be attached to or integral with the base or body portion of the brassiere at any angle most suitable for supporting any certain formation of the breast tissues. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a top plan view of a brassiere constructed in accordance with and embodying the present invention;

FIG. 3 is a bottom plan view of the brassiere constructed in accordance with and embodying the present invention and showing the outline of the breast portions in broken lines;

FIG. 4 is a side elevational view of a brassiere constructed in accordance with and embodying the present invention and showing the outline of the breast portions in broken lines;

FIG. 5 is a perspective view of the brassiere with shoulder and back straps attached and showing the outline of the breasts in broken lines;

FIG. 7 is an exploded front view of another modified form of the present invention;

FIG. 8 is a further modification of the cup extension used in the brassiere shown in FIG. 7;

FIG. 10 is a fragmentary sectional view taken along line 10—10 of FIG. 8;

FIG. 12 is a perspective view of still another modified form of brassiere;

FIG. 13 is a top plan view of the brassiere illustrated in FIG. 12;

FIG. 14 is a front elevational view of the brassiere illustrated in FIG. 12;

Corresponding reference characters indicate corresponding parts throughout the several views of the drawings.

Figure 1:
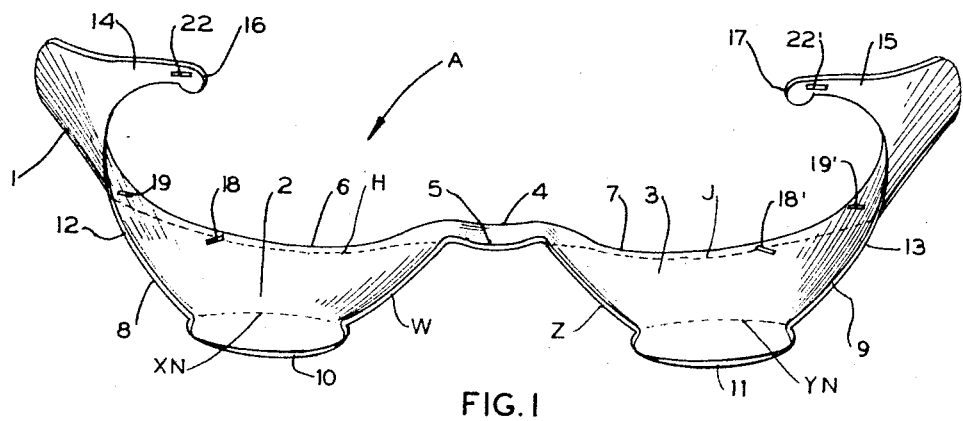

Referring now in more detail and by reference characters to the drawings, which illustrate practical embodiments of the present invention. A designates a brassiere which is preferably, though not necessarily, constructed of plastic or other light synthetic resins, such as vinyl plastisol, polyethylene, polypropylene, polyvinylchloride, and nylon (or such material combined with or overlaying softer material such as cotton, linen, rayon, nylon, etc. or metals, aluminum, wire, and the like) comprising a body portion 1 and two breast-supporting cups 2, 3, integrally formed thereon. Body portion 1 is adapted to be worn-adjacent the breast and, in particular, around the lower portions and outer sides of the breast.

Cups 2, 3, are connected by a center portion 4 that is sized to fit between the two breasts of a woman adjacent her body and is integrally provided with an upwardly extending arcuately shaped projection 5. Cups 2, 3, moreover, have lower edges H, J, that are designed to circumferentially underline and support the breast while urging it upwardly from below into a new and higher line.

Figure 2:
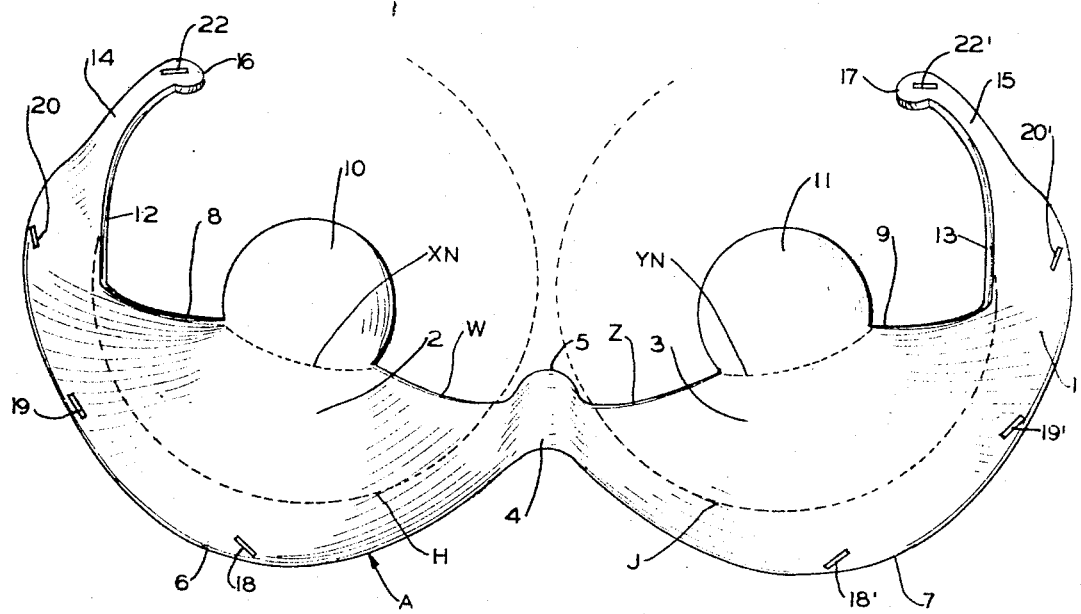
FIG. 2 is a front elevational view of a brassiere constructed in accordance with and embodying the present invention and showing the outline of the breast portions in broken lines.

In FIG. 2, the lower edges 6, 7, are designed to follow the contours of lines of the certain forwardly extending portion of the frontal ribs upon which they are to rest, bracing the brassiere from the bottom. Breast-supporting cups 2, 3, are provided with upper edges (outer) 8, 9, and (inner) W and Z, that are somewhat aligned and which are shaped to extend along a generally horizontal line across the lower portion of the breast so that the breast cups generally cover only the lower portion of the breast, below the mammilla or nipple area. Upper edges W, Z, of breast cups 2, 3, curve downward from the base of nipple covers X–N and Y–N to projection 5 (toward the center of the body) and edges 8, 9, curve downward from X–N and Y–N, respectively, to outwardly presented margins 12, 13, respectively, at their outer edges. H and J in FIG. 2 are concavely formed on their outer surfaces linear curves defining the lower line of the breast as it is held by the present brassiere. The convex lines adjacent to the body raise substantially above the natural lower line of the outer, lower portions of the breasts to effect the shifting of the major weight of the breast from its natural low and outward position, inwardly and upwardly toward the nipple area, causing considerable expansion of the breast measurement. Integrally formed on upper edges 8, 9, and W, Z, of breast cups 2, 3, are two upwardly extending somewhat semi-circular nipple covers 10, 11, that are outwardly convexly contoured with a mammiform shape so as to conform to the general shape of the nipple area.

Integrally formed on upwardly presented edges 8, 9, of breast-supporting cups 2, 3, adjacent outwardly presented margins 12, 13, are two upwardly and inwardly extending shoulder strap tab or flange members 14, 15, that terminate in slightly enlarged ears 16, 17, respectively, and are curved so as to extend along the outer peripheral portions of a woman's breast.

Cups 2, 3, are preferably constructed with somewhat greater strength along their lower portions than in the upper portions by less open area and their particular contour. Cups 2, 3, moreover, are shaped at their lower margins J and H to form rather sharply inflected upward angles with body portion 1, so as to afford somewhat shelf-like support to the undersides of the breast.

Any or all of the edges of brassiere A may be rounded to prevent cutting or irritation of the skin of the wearer. The rigid nature of the material with which the brassiere is made, when contoured to fit all concave and convex areas of the thorax over which it is worn, prevents the brassiere from sliding on the body as well as preventing pressure or uncomfortable stress on any of the portion of the body it covers. The rigid nature of the material also causes the brassiere's entire outline to remain proportionately constant while on the wearer's body. Along its lower margin, body portion 1 is provided with apertures 18, 18', 19, 19', 20, 20', for receiving a standard type of back strap 21 suitably secured as at P (FIG. 5). Back strap 21, being of a conventional nature, is not described in detail. Ears 16, 17, of upward extending shoulder strap tab members 14, 15, are similarly provided with apertures 22, 22', for receiving standard shoulder straps 23, 23', which are stitched or otherwise rigidly secured at points 24, 24'. Shoulder straps 23, 23', similarly, are not described in detail, since they are of a standard or conventional type.

It is obvious that by means of brassiere A, the wearer's breasts are supported from beneath and the breasts are thereby urged upwardly and into only slightly curved relation to the rib cage area at their heaviest lower portions so that these tissues assume a forwardly extending less pendulant position. Breast-supporting cups 2, 3, moreover, are rigid enough to provide this necessary support and yet afford sufficient resilience for providing variable alignment with the shape and structure of the wearer's breasts at the nipple area and also with the portion above the brassiere. The bottom portion of cups 2, 3, having a greater degree of rigidity, affords the strength for firm upwardly support of the breasts, while the upper portion of the cups, having more resilience, conforms to variations in the breast-size of different wearers. In addition to the supporting means, this type of design gives an effectual, yet natural, appearance to the breasts of the wearer. Moreover, it should be obvious that since the brassiere is constructed of a synthetic resin or synthetic-coated material, such as vinyl plastisol, polyethylene, polypropylene, polyvinylchloride, and nylon, it can be worn with swimming suits, halters and other types of athletic dress designed for women, since the somewhat rigid synthetic resin or synthetic-coated material will afford considerable protection to a woman's breasts, as well as, by its open area, allow perspiration to evaporate and water to dry quickly after a wearer swims. This prevents withering and diminishing of the breast tissues.

Figure 6:
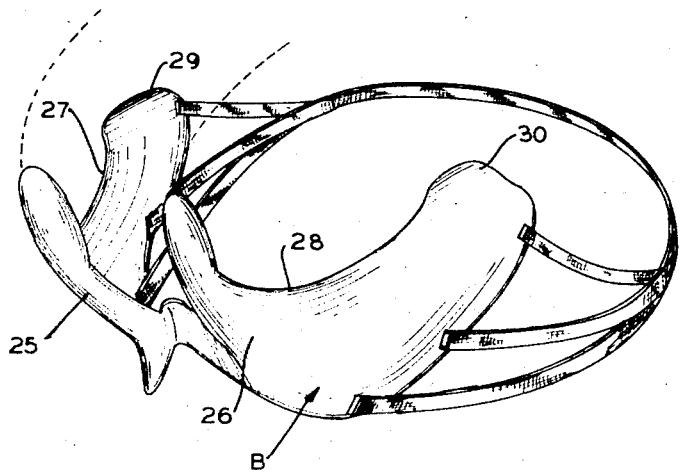
FIG. 6 is a perspective view of a modified form of the present invention with back straps attached and showing the outline of the breasts in broken lines.

It is possible to provide a modified form of brassiere A (brassiere B) substantially as shown in FIG. 6. Brassiere B is very similar to brassiere A and is provided with breast-supporting cups 25, 26, having upper margins 27, 28, respectively that extend generally below the horizontal medial line of the breast so that the cup covers only the lower portion of the breast as in brassiere A. Brassiere B is not provided with upwardly extending shoulder tab members 14, 15, as in brassiere A, but, rather, is rounded off forming margins 29, 30, adjacent upwardly presented margins 27, 28, respectively. It should be obvious that brassiere B can be worn with low-cut dresses and formals and is more suitable for this purpose than the so-called "strapless bra," because of extremely low-cut upper margins 27, 28, of breast-supporting cups 25, 26.

Figure 9:
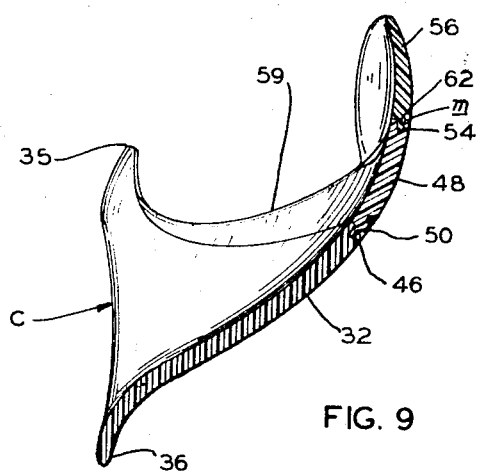
FIG. 9 is a fragmentary sectional view taken along line 9—9 of FIG. 7.

It is possible to provide another modified form of the brassiere C, substantially as shown in FIGS. 7 and 9. Brassiere C is similarly constructed of plastic, light synthetic resin, or synthetic-coated material, of the type previously mentioned, and comprises a body portion 31 and two breast-supporting cups 32, 33, integrally formed thereon. Breast-supporting cups 32, 33, are connected by a center portion 34 that is sized to fit between the peripheral edge of the two breasts and which has an upwardly extending arcuately shaped projection 35. Body portion 31 has lower margins 36, 37, which are designed to follow the lines of a forwardly protruding rib, substantially below the breast upon which these lower edges of the brassiere are securely braced or anchored to sustain the position of cups 32, 33, and the breasts in their upward position. Cups 32, 33, terminate in upper margins 38, 39, that are shaped to extend along downwardly-curved transverse lines at the very lower portion of the breasts so that the cups generally cover only a very scant portion of the breasts and essentially act as an upwardly urging support. As in the case of brassieres A and B, cups 32, 33, of brassiere C are constructed with a greater degree of strength which may be effected by the concavity of form of the meeting line of the lower edge of cups 32, 33, with body portion 31, greater thickness of material, or lesser open space in the area of the cup's lower portion for affording rigidity and strength to give firm upward support to the breasts. The upper portions are also constructed, as in brassieres A and B, to have greater resilience by having greater open area to afford the upper portion of the cups the flexibility to conform to the size of the breast of the wearer. Cups 32, 33, also form sharply inflected angles with the adjacent frontal body portion 31 and with the body of the wearer over which this portion of the brassiere is worn for providing upward support of the breasts. Integrally formed on upwardly presented margins 38, 39, adjacent outwardly presented margins 40, 41, are two upwardly and inwardly extending shoulder strap tab members 42, 43, designed to curve in a line along the outer peripheral portion of a woman's breasts and which are integrally provided at their upper ends with ears 44, 45, respectively.

Upwardly presented margins 38, 39, are provided along their entire lengths with recessed grooves 46, 47. Provided for attachment to upper margins 38, 39, of cups 32, 33, are upwardly extending arcuately-shaped support members 48, 49, that are integrally provided with downwardly extending tongue-like flanges 50, 51, respectively, adapted for snap-fitting engagement in grooves 46, 47, respectively. Support members 48, 49, are similarly contoured to control the shape and structure of the breasts over which they are disposed. Supports 48, 49, are, moreover, provided along their upwardly presented margins 52, 53, with recessed grooves 54, 55, extending the entire length thereof. Provided for attachment to upwardly presented margins 52, 53, of support members 48, 49, are upwardly extending, somewhat semi-circular shaped, nipple covers 56, 57, that are outwardly convexly contoured so as to conform to the general shape of the area immediately surrounding the nipple and are provided with outwardly extending flanges 58, 59, 60, and 61, respectively. Nipple covers 56, 57, define lower margins $m$, $m'$, which are provided with downwardly extending flanges 62, 63, that extend lengthwise of lower peripheral margins $m$, $m'$, and are sized for disposition into grooves 54, 55 respectively. The edges of brassiere C are similarly curved outwardly and rounded so as to prevent cutting or irritation to the skin of the wearer as in brassieres A and B. Breast-supporting cups 32, 33, are respectively provided with eyelets 64 and 64' spaced as in the case of brassieres A and B for accepting a standard type of back strap (not shown). Shoulder-strap supports 42, 43, are also provided with eyelets 65, 65', at their head portions 44, 45, respectively, for accepting a standard type of shoulder strap (not shown).

It should be obvious that by means of the above-outlined construction, brassiere C provides support to a woman's breast mainly from beneath. This brassiere, although rather scanty in nature, still provides sufficient support and gives an effectual and natural-like appearance to the breasts of the wearer. Support members 48, 49, when integral with or detachably secured by the attachment of tongues 50, 51, to grooves 46, 47, of cups 32, 33, respectively, can be worn without nipple cover units 56, 57. This type of segmentive brassiere is very useful in cases of breast feeding, whereby a woman desiring to nurse a child can simply remove nipple covers 56, 57, by pulling the same upwardly. This type of brassiere is also very advantageous in cases where breast operations have been performed, wherein standard types of brassieres irritate and often infect a scar. Brassiere C can be worn in the scan manner herein described and yet provide sufficient support.

It is possible to provide modified nipple covers 66, as shown in FIG. 8, which are substantially the same as a combination of nipple cover 57 and support 49. Nipple covers 66 are similarly provided with semicircular nipple cover segments $y$, convexly contoured to conform to the general shape of the nipple area. Integrally formed thereon is a downwardly extending support member 68 with two horizontal extension members 69, 70, defining a lower margin 71. Lower margin 71 is provided with a downwardly extending flange 72 sized for disposition in groove 47. It will, of course, be obvious that nipple covers 66 must be shaped as "right" and "left" elements inasmuch as the human body is thus contoured.

Figure 11:
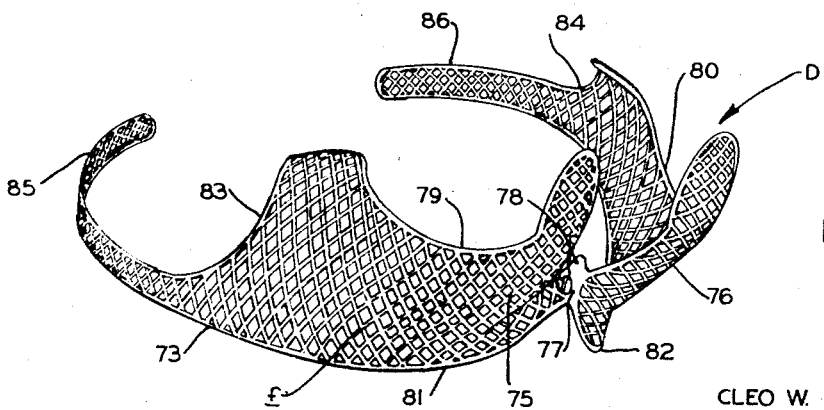
FIG. 11 is a perspective view of an additional modified form of the present invention.
Figure 15:
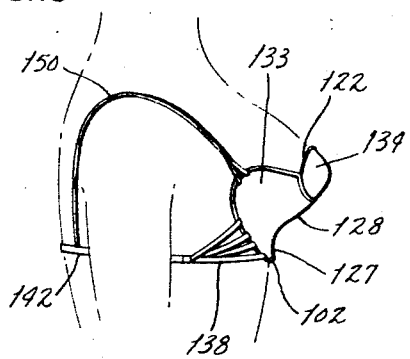
FIG. 15 is a side elevational view of the brassiere shown in FIG. 12, a human torso being shown in phantom.

It is possible to provide a further modified form of brassiere D substantially as shown in FIG. 11. Brassiere D is very similar to brassiere B, as shown in FIG. 6, and also preferably, though not necessarily, constructed of a synthetic resin or synthetic-coated material. Brassiere D comprises a body portion 73 and two breast-supporting cups 75, 76, that are integrally formed thereon and connected by a center portion 77 having an upwardly extending arcuately shaped projection 78 and sized to fit between the breasts adjacent the body of the wearer. The size and shape of cups 75, 76, and the nipple covers formed thereon are substantially similar to brassiere B and, hence, will not be herein described. Cups 75, 76, however, define upper margins 79, 80, lower margins 81, 82, and outwardly presented margins 83, 84. Back-retaining members 85, 86, are integrally formed on body portion 73 at outwardly presented margins 83, 84, adjacent upper margins 79, 80. Back-retaining members 85, 86, extend around the sides of the thorax of the wearer and terminate with rounded ends at any convenient portion of the back of the wearer.

It should be obvious that back-retaining members 85, 86, which are molded to the detailed contour of the wearer's body and are designed to create a tension or springing action upon the portion of a woman's thorax over which it is worn, are sufficiently rigid to hold brassiere D onto the wearer's body and yet provide sufficient resilience to be somewhat adaptable to the size of the wearer. Breast-supporting cups 75, 76, of brassiere D are similarly rigid enough to provide necessary support and yet afford sufficient resilience for generally conforming to the particular size of the wearer's breasts. Brassiere D can be worn with low-cut dresses and formals as in the case of brassiere B.

Brassiere D can be constructed, by molding, stamping, or any other suitable process, from a rather porous type of reticulated material *f*, substantially as shown in FIG. 11. This type of construction affords a maximum degree of access for air and sunrays to the breasts. This is highly desirable for the health and strength of the breast tissues and also to allow for evaporation of excessive perspiration therefrom. The wearer of brassiere D would bend resilient back-retaining members 85, 86, outwardly, causing somewhat of a bending movement about center portion 77. Therefore, center portion 77 and upwardly extending arcuately-shaped projection 78 should be integrally formed of material which may or may not be adorned with open design, but which affords sufficient strength to withstand any breaking force exerted thereon. While reticulated material *f* is provided with a design of square apertures, it should be understood that any type of design, such as a heart, circles, or stars could be used. Moreover, it should be obvious that this type of reticulated material could be used in the construction of any of brassieres A, B, or C, or upwardly extending suppport members 48, 49, or nipple covers 56, 57, 66, or projections 42, 43, herein shown. Any one of brassieres A, B, C, or D, may be adorned or ventilated with open designs of varied types, shapes, and sizes within its entire area.

Figures 12, 13, 14:
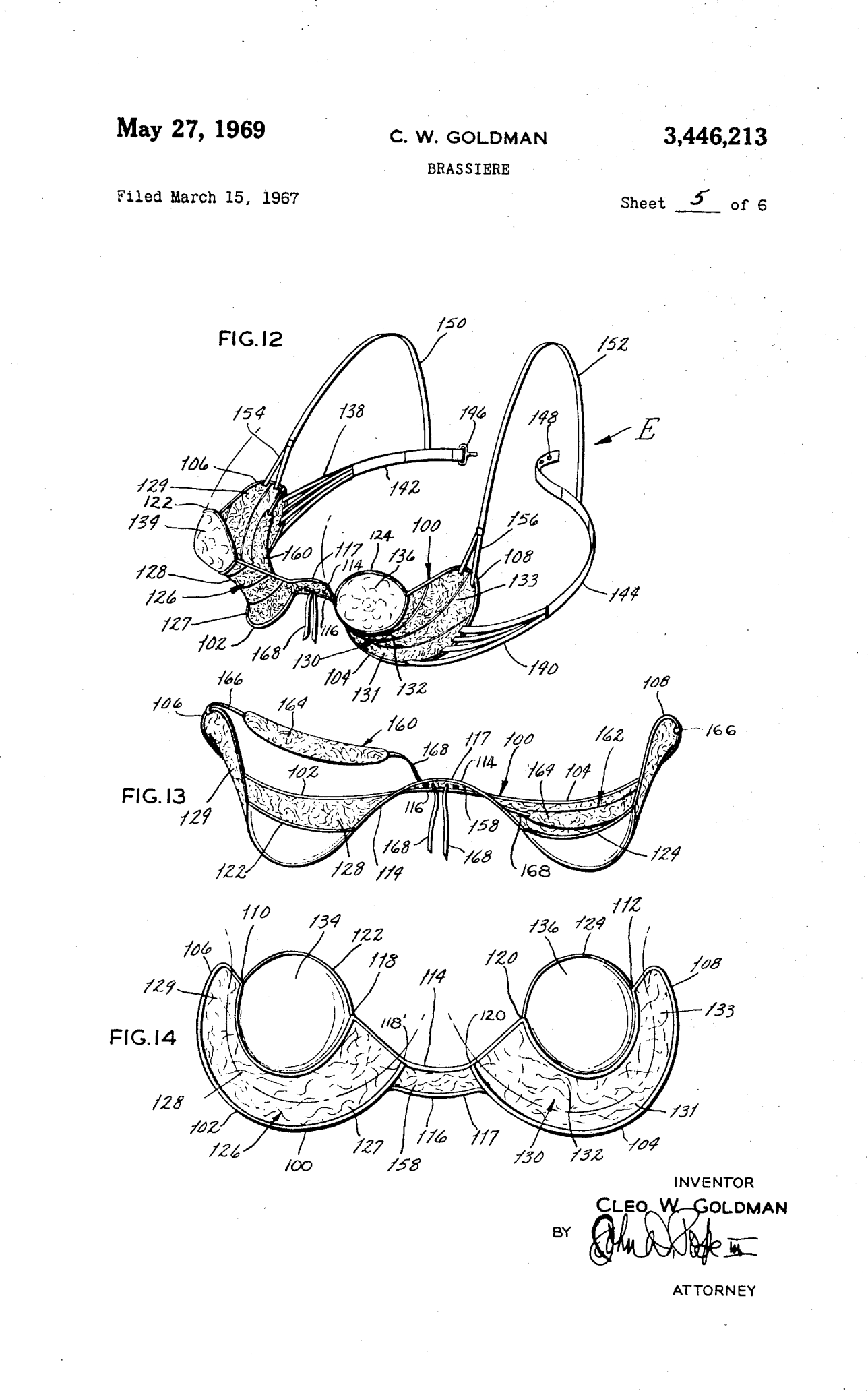

Referring now to FIGS. 12–15, it is also possible to provide another modified brassiere E including a frame 100 constructed from a resilient material such as high carbon steel wire or a resilient synthetic material such as nylon, polypropylene, polycarbonate or polyethylene. Frame 100 includes two arcuate lower marginal sections 102, 104, which abut against the wearer's rib cage immediately beneath her breasts, sections 102, 104, outwardly and integrally merging into curved side sections 106, 108, respectively, which extend upwardly along the side of the wearer's two breasts to points slightly above the nipples where they turn forwardly and terminate after a short distance at points 110, 112 (FIG. 14). At their opposite or inner ends 18 and 20, lower marginal sections 102, 104, are secured to upper and lower transversely extending intermediate elements 114, 116 (respectively), which, in effect, form a separation span 117 interposed between the wearer's breasts adjacent her sternum. Upper intermediate element 114 extends arcuately upwardly beyond the inner ends 18 and 20 of lower marginal sections 102, 104, and terminates at points 118, 120, located opposite points 110, 112, respectively and in close proximity to the wearer's nipples. Lower marginal sections 102, 104, side sections 106, 108 and lower intermediate element 116, are all formed from substantially the same gauge wire or synthetic resin, while upper intermediate element 114 is preferably formed from slightly smaller gauge wire so as to impart somewhat greater flexibility thereto.

In cases where the lower element 116 may be omitted, however, and the separation is formed only by the upper element 114, it will be formed of the stronger wire in its horizontal section (as forms sections 102, 104) but its upper, transversal sides (between points 118 and 18 and between points 120 and 20, only will be formed of lighter gauge wire to impart greater flexibility thereto.

Rigidly secured to the ends of side section 106 and upper element 114 at points 110, 118, respectively, is a substantially circular ring-like mount 122 which encircles the nipple of the wearer's right breast. Similarly encircling the nipple of the wearer's left breast and rigidly affixed to side section 108 and upper intermediate element 114 at points 112, 120, is another substantially circular wire ring-like mount 124 as shown in FIG. 14. Mounts 122, 124, are formed from a somewhat lighter gauge wire or material than the remaining sections of frame 100. In order to avoid abrading the skin and to render brassiere E more comfortable, frame 100, FIG. 12 and FIG. 13, is preferably dipped or otherwise coated with a soft synthetic resin such as vinyl plastisol, or other suitable material. The portions of upper element 114 located beyond separation span 117, that is beyond points 18, 20, and the lower semi-circular portions of ring-like mounts 122, 124, form upper frame elements.

Sewed or otherwise secured to the lower marginal section 102, side section 106, upper intermediate element 114, and the lower semi-circular portion of mount 122 and enclosing the area defined thereby is a lift-mold 126 preferably formed from a flexible synthetic resin mesh material (FIG. 14). Lift-mold 126 is molded and secured to the aforementioned portions of frame 100 in such a manner that it is concaved on the outer surface (slightly inwardly), adjacent lower marginal section 102 in the formation of a crescent or hoof-shaped flange 127 (FIGS. 12 and 14) which integrally merges into an upper breast-containing portion 128 having a substantially planar side portion 129 located adjacent curved side section 106 of frame 100 (FIG. 14). Similarly secured to lower marginal section 104, side section 108, upper intermediate element 114, and the lower semi-circular portion of mount 124 and enclosing the area defined thereby is another lift-mold 130 which is also provided with an inwardly concaved, (on its outer surface,) crescent or hoof-shaped flange 131 and an upper breast-containing portion 132 having a substantially planar side portion 133 located adjacent curved side section 108 of frame 100. Flanges 127, 131, engage the wearer's rib cage immediately below her breasts and, in effect, urge or roll the breasts upwardly into the remaining or upper breast-containing portions 128, 132, of lift-molds 126, 130, respectively that is, into the portions located between ring-like mounts 122, 124, and flanges 127, 131, respectively, and thereby, in effect, cast the wearer's bosom in a more idealistic and aesthetic form. Moreover, side portions 129, 133, of lift-molds 126, 130, respectively fit snugly against the heavy side tissues of the breasts and urge the breasts toward one another to further enhance the appearance of the bosom. In this connection, it should be noted that if frame 100 is fabricated from wire it can be bent to bring lift-molds 126, 130, into conformity with the idealistic shape of the wearer's bosom so as to insure a proper fit and maximum support.

Secured to and enclosing the area defined by circular ring-like mounts 122, 124, are fabric nipple covers 134, 136, respectively FIG. 14 and FIG. 12.

Attached to frame 100 at spaced intervals along lower marginal sections 102, 104, and side sections 106, 108, are a plurality of rearwardly converging side ribbons 138, 140, which merge into back straps 142, 144, respectively, as shown in FIG. 12. At its end, back strap 142 is provided with a conventional hook 146 which engages any one of a plurality of spaced grommets or eyelets 148 located on the corresponding free end of back strap 144, as also shown in FIG. 12. Intermediate their ends, back straps 142, 144, are formed from an elastic material having hooks for releasably engaging the end of shoulder straps 150, 152, the opposite ends of which are sewed or otherwise fastened to downwardly diverging support ribbons 154, 156, respectively, which are, in turn, releasably attached to the rear and uppermost portion of curved side sections 106, 108, as best seen in FIG. 12.

Interposed between separation span 117, which is also covered with a synthetic resin mesh material 158, and curved side sections 106, 108, are secondary lifts 160, 162 (shown in FIG. 13), each comprising an elongated hammock 164 provided at its outer end with a tail section 166 and at its inner end with an adjusting ribbon 168. Tail sections 166 are fastened to side sections 106, 108, in close proximity to lower marginal sections 102, 104, by means of hooks while adjusting ribbons 168 are fitted through the apertures in mesh material 158 of separation span 117.

In use, brassiere E in its simplest form, that is without shoulder straps 150, 152, and secondary lifts 160, 162, is emplaced on the user's body by fitting lift-molds 126, 130, under the wearer's breasts and extending back straps 142, 144, rearwardly around the wearer's thorax until the ends thereof come into juxtaposition, whereupon hook 146 is fitted into an appropriate eyelet 148. When properly emplaced, flanges 127, 131, will fit against the wearer's rib cage immediately below her breasts and will urge the breasts upwardly into the remaining or breast-containing portions 128, 132, of lift-molds 126, 130, respectively thereby giving the bosom a much fuller effect than could otherwise be achieved with conventional fabric brassieres. At the same time side portions 129, 133, of lift-molds 126, 130, will be drawn slightly rearwardly by the force exerted on side ribbons 138, 140, and will accordingly bear against the sides of the wearer's breasts so as to urge them toward one another. Although it should be noted that frame 100 possesses sufficient rigidity to control the side tissues of the breasts without the co-operation of back straps 142, 144, and side ribbons 138, 140, this further enhances the fullness of the bosom. Moreover, it controls rather heavy and flabby side tissues located immediately below the wearer's arms. If brassiere E incorporates a steel or other resilient but yieldable frame 100 it can be bent to fit the idealistic contour of the wearer's bust. Furthermore, it can be seen that brassiere E, by engaging the wearer's rib cage, causes the heaviest breast tissues to flow into the breast-containing portions 128, 132, of lift-molds 126, 130, where they are adequately controlled and supported. Hoof-shaped flanges 127, 131, by engaging the rib cage, form a new and higher lower line for the wearer's bust. Conventional brassiere cups, on the other hand, conform to the lower line of the natural breast and extend downwardly toward the side of the body, thereby encouraging the heavy breast tissues to flow into an unflattering, outward and downward direction which greatly increases the bulkiness of the tissues toward and under the arms. In fact, conventional brassieres encourage the entire breast to move outwardly in unbecoming and harmful positions.

Inasmuch as back straps 142, 144, are located relatively low on the wearer's thorax, brassiere E can be worn with formals, exposed-back dresses, swim suits, and other apparel having relatively low backlines or low necklines.

If desired, shoulder straps 150, 152, may be attached to give greater uplift to the bosom, although it should be noted that brassiere E adequately controls moderately sized breasts without resorting to such over-the-shoulder straps. By attaching secondary lifts 160, 162 (as shown in FIG. 13) even the most pendulous feminine breasts can be adequately supported and controlled by brassiere E, and accordingly brassiere E need not be supplied in multiple cup sizes. In the case of average breasts, these secondary lifts can be used to give additional fullness for special occasions, such as when the wearer dons a particular figure-flattering item of apparel, without resorting to padding and other bust-enlarging devices. The degree of lift and corresponding upper-bust fullness of the bosom can be adjusted merely by pulling the portion of adjusting ribbons 168 depending from separation span 117.

Inasmuch as lift-molds 126, 130, and hammocks 164 of secondary lifts 160, 162, are fabricated from a mesh material, most of the skin of the breasts remain exposed for reception of health generating sunlight, and perspiration can evaporate therefrom. Obviously, this represents an improvement over conventional fabric brassieres, especially those employing pads which block sunrays and prevent adequate evaporation of moisture, thereby suffocating the breasts which, in turn, causes a weakening of the breast tissues and a diminishing of the size of the bosom.

If desired, brassiere E can be fitted with brims made of nylon fabric, net, lace, or the like which brims are sewed or otherwise secured to the upper semi-circular portion of mounts 122, 124, as well as to the terminal portions of side sections 106, 108, and transversely extending intermediate element 114 so as to cover the upper tissues of the breasts.

Figure 16:
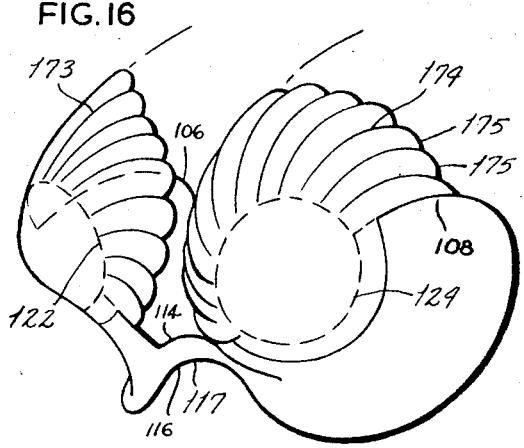
FIG. 16 is a perspective view of the brassiere illustrated in FIG. 12 with bonnet-brims forming part of the present invention attached thereto.

Similarly, as will be seen by reference to FIG. 16, brassiere E may be provided with bonnet brims 173, 174, comprising a plurality of molded plastic overlapping segments 175 which are secured to and project rearwardly from the upper semi-circular portions of mounts 122, 124. In the case of smaller breasts, the natural bias of the synthetic resin material urges segments 175 together in a somewhat tight-fitting overlapped configuration. However, when worn on fuller bosoms, segments 175 fan or spread outwardly so as to conform to the contour of the breast, thereby alleviating the requirement for supplying brassieres in multiple cup sizes.

Figure 17:
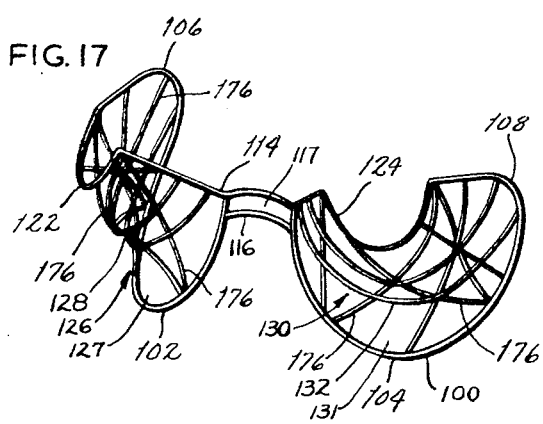
FIG. 17 is a perspective view of a reinforcing frame forming part of the present invention.

Also, as will be seen by reference to FIG. 17, it is possible to furnish brassiere E in a reinforced version particularly adapted for supporting heavier bosoms. In such a case lift-molds 126, 130, are reinforced by a multiplicity of contoured relatively rigid connecting elements 176 as shown in FIG. 17, which may be wire or plastic or even a stamping and are rigidly fastened at their ends to the lower marginal sections 102, 104, side sections 106, 108, upper intermediate element 114 and the lower semi-circular segment of mounts 122, 124. Moreover, connecting elements 176 are rigidly soldered or otherwise secured to each other at their junctures so as to maintain lift-molds 126, 130, in the proper contour. It should be understood that a plastic mesh material (as shown in FIG. 12), which has been omitted from FIG. 17 in the interest of clarity, extends over connecting elements 176 and can be either permanently or detachably fastened thereto. Frame 100 forms the outline of the reinforcement elements described above and the contour of the reinforcing unit conforms exactly to the molded form of the brassiere that it reinforces and fits upon. Moreover, if desired, brassiere E can be supplied without nipple covers 134, 136 (FIG. 12) in which case only the lower semi-circular portion of mounts 122, 124 (as shown in FIG. 17) would be necessary. Such a brassiere is desirable for use under lined swim suits, formals, and the like, where the wearer needs only the support of breast-containing portions 128, 132, or for use in hot climates where it is desirable, as a matter of comfort, to wear abbreviated brassieres.

Figure 18:
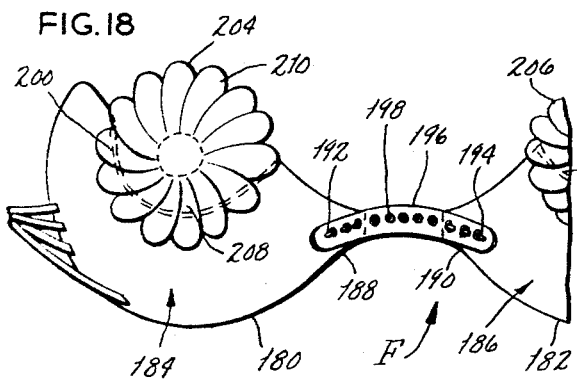
FIG. 18 is a fragmentary front elevational view of a further modified form of brassiere.

Referring now to FIG. 18, it is possible to provide another modified brassiere F which is very similar to brassiere E but instead of having a unitary frame, it is provided with separable frames 180, 182, to which lift-molds 184, 186, are fastened, respectively, lift-molds 184, 186, being contoured similarly to lift-molds 126, 130. Frames 180, 182, inwardly terminate adjacent the wearer's sternum in opposed mounting ears 188, 190, each of which is provided with a plurality of spaced hooks 192, 194, which project laterally toward the side margins of frames 180, 182, respectively. Interconnecting frames 180, 182, is a bowed spanner element 196 provided with a plurality of longitudinally spaced apertures 198 which accept hooks 192, 194, and thereby hold frame halves 180, 182, in proper spaced relation. The distance between frames 180, 182, can be adjusted merely by engaging a different series of apertures 198. Thus, the spacing of lift-molds 184, 186, can be altered to achieve the desired fit.

At their upper margins lift-molds 184, 186, are fastened to relatively rigid arcuate mounts 200, 202, located immediately below the wearer's nipples, arcuate mounts 200, 202, in turn, forming an integral part of frames 180, 182. Secured to and projecting upwardly from arcuate mounts 200, 202, are molded synthetic resin nipple covers 204, 206, each having a semi-circular portion 208 and a plurality of overlapping petals 210 radiating therefrom. When worn with larger breasts, petals 210 will expand or fan outwardly against the natural bias of the synthetic resin so as to adequately cover the nipple area of the breast. On the other hand, when brassiere F is worn upon breasts of lesser depths, the force exerted on nipple covers 204, 206, will obviously be less and the petals spring back toward their molded configuration, the degree of return being dependent on the size of the particular breasts. This feature enables the wearer to have perfect fit upon the nipple area of her breasts, an end which is rarely attained with conventional brassieres.

Figure 19:
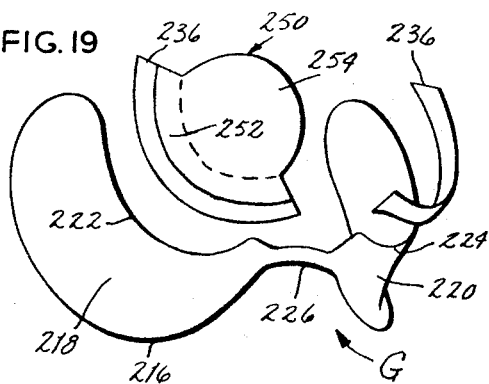
FIG. 19 is an exploded perspective view of an additional modified form of brassiere.

Referring now to FIG. 19, it is possible to provide still another modified brassiere G which is also quite similar to brassiere E. Brassiere G includes a frame 216 including two abbreviated lift-molds 218, 220, the upper margins of which are arcuate upper segments 222, 224, which inwardly terminate in close proximity to a separation span 226. Segments 222, 224, integrally include plastic moldings having upwardly opening grooves similar to those illustrated in FIGS. 9 and 10. Detachably secured to segments 222, 224, are intermediate support sections 236 which are contoured to conform to the idealistic configuration of the undersides of the wearer's breasts, that is the portion over which they are worn. Along their lower margins intermediate support sections 236 are integrally provided with downwardly extending tongue-like flanges, also similar to those illustrated in FIGS. 9 and 10, the flanges being adapted for snap-fitting engagement with the grooves of support segments 222, 224, to hold intermediate support sections 236 rigidly in place on frame 216. Along their upper margins, support sections 236 are also integrally provided with upwardly opening grooves. Detachably secured to support sections 236 are nipple cover units 250 each comprising nipple cover supports 252 and nipple covers 254, the latter of which can be similar to any of the foregoing nipple covers. Along their lower margins, nipple cover supports 252 are provided with downwardly extending tongue-like elements which engage the upwardly opening grooves in support sections 236 and hold nipple cover units 250 on intermediate support sections 236.

In use, the wearer can wear brassiere G with or without nipple cover units 250, depending on the occasion. If the wearer needs only the support rendered by lift-molds 218, 220, or the combination of these lift-molds with intermediate sections 236, described above, to wear with lined swim suits, formals, or the like, then brassiere G can and should be worn without nipple cover units 250. Similarly mothers of newborn babies can nurse such infants merely by unsnapping nipple cover units 250 from the lower portion of the lift-molds from section 236 (upper margins), to expose the nipples. Moreover, intermediate support sections 236 of various sizes can be supplied, thus providing the purchaser with the capability of building her own abbreviated brassiere to match the idealistic contour of her breasts. This feature insures greater perfection in fit upon the breasts of each individual figure.

Figure 20:
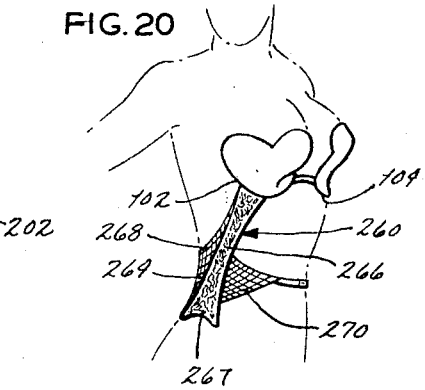
FIG. 20 is a perspective view of a brassiere supported on a human torso by means of side supports forming part of the present invention, the torso being shown in phantom.

Referring now to FIG. 20, brassieres E, F, and G can be provided with side supports 260 which extend diagonally from the wearer's hip bones up over the rib cage where they are fastened at their upper ends to the lower margins of the particular brassiere of which they form a part. Each side support 260 comprises a resilient wire or plastic frame 264 over which a suitable mesh material 266 is fitted to lend rigidity thereto. At their uuper ends, frames 264 abut against and are secured to the lower margins of the particular brassiere of which they form a part. In the case of brassiere E the upper end of frames 264 would be fastened to lower marginal sections 102, 104, of frames 100. Side supports 260 are molded to exactly fit the portion of the feminine figure over which they are worn. They extend obliquely downwardly from frame 100 across the wearer's rib cage to her hib bones where the lower ends of frame 264 are flared slightly outwardly and are provided with an arcuate lower margin 267 for engaging the upper extremity of the wearer's hip bones. Side supports 260 are held in place by means of front and rear somewhat narrow elastic wastbands 268, 270, which flare outwardly along the wearer's sides and are attached to the rearwardly and forwardly presented side margins respectively of the frames 264, of supports 260.

Side support 260 may be used in conjunction with brassieres E, F, and G for rendering additional support to heavy breasts which would otherwise cause excessive pressures upon the skin covering the rib cage. Furthermore, when side supports 260 are utilized the foregoing brassieres can be worn without back straps and accordingly such brassieres can be worn with fashionable extremely low-cut formals and other apparel in lieu of uncomfortable conventional corset-like strapless brassieres.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A brassiere constructed of a synthetic resin material, said brassiere comprising a band-like body portion adapted to extend in a substantially horizontal direction across the thorax of the wearer directly beneath the breasts, two laterally spaced breast-containing portions extending upwardly from the upper margin of the body portion and being integrally formed thereon, the breast-containing portions having their upper margins along a transverse line located below the nipple of the wearer's breast, and a nipple cover carried by each of said breast containing portions and extending upwardly therefrom for covering the nipple of the wearer's breast.

2. A brassiere according to claim 1 in which the upper margin of the breast-containing portions are substantially straight and horizontal.

3. A brassiere according to claim 1 in which the breast-containing portions include upper and lower portions, the lower portion projecting upwardly and forwardly at an oblique angle with reference to the body of the wearer for providing an upward lift to the breasts, said brassiere being further characterized by nipple covers removably attached to the upper margins of the breast-containing portions and extending upwardly therefrom for covering the nipple of the wearer's breasts.

4. A brassiere according to claim 3 in which the outer peripheral margins thereof are turned slightly outwardly.

5. A brassiere according to claim 1 in which the breast-containing portions each include an upper and a lower portion, said lower portion of each breast-containing portion projecting forwardly and upwardly at an oblique angle with reference to the body of the wearer for providing an upward lift to the breasts, the lower portion being constructed with a slightly greater degree of material thickness than the upper portion, whereby said lower portion will be more rigid and provide strong upward support and said upper portion will have more resilience to conform to various sizes of breasts.

6. A brassiere according to claim 1 and further characterized by two upwardly and inwardly extending flange members formed on the outer margins of the breast-containing portions, the flange members being provided with slots for accepting a conventional type of shoulder strap, the breast-containing portions being provided with a plurality of elongated slots along their lower and rearward margins for accepting a conventional type of back strap.

7. A brassiere comprising a frame adapted to fit against the wearer's thorax immediately below her breasts, lift-molds carried by the frame, each lift-mold having a breast-containing portion adapted to engage the underside of the wearer's breast and urge it upwardly whereby to give a fuller appearance to the breasts, secondary lifts carried by the frame and located intermediate the lift-molds and the underside of the wearer's breasts, the distance between the lift-molds and the secondary lifts being adjustable whereby the upper fullness of the wearer's breasts can be altered, and support means for holding the frame and lift-molds on the wearer's body.

8. A brassiere according to claim 7 wherein a separation span is located intermediate the lift-molds adjacent the wearer's sternum, and wherein the secondary lifts extend between the side of the frame and separation span are adapted for optional securement to the separation span in a multiplicity of positions so that the distance between the secondary lifts and lift-molds can be varied whereby the upper fullness of the wearer's bosom can be altered.

9. A brassiere comprising a flexible wire-like frame including a pair of lower marginal frame sections shaped to abut against the wearer's rib cage beneath her breasts, a separation span connecting the lower marginal frame sections, side sections connected to the lower marginal sections and extending rearwardly and upwardly to a point at least as high as and to the rear of the wearer's nipples where they turn forwardly and terminate in close proximity to the nipples, and upper frame sections interconnecting the separation span and the upper ends of the side sections; lift-mods carried by the frame and formed from a flexible sheet-like material, the lift-molds integrally including crescent-shaped flanges connected to the lower marginal frame sections and adapted to engage the wearer's rib cage beneath her breasts, upper breast-containing portions connected to the flanges and upper frame sections and adapted to urge the wearer's breasts upwardly, and side portions connected to the side sections of the frame and adapted to bear against the sides of the wearer's breasts; and support means connected to the frame for holding the lift-molds against the wearer's breasts.

10. A brassiere according to claim 9 in which the flanges are concaved inwardly so as to urge the breasts upwardly into the breast-containing portions of the lift-molds.

11. A brassiere according to claim 9 wherein the upper frame sections include ring-like mounts which surround the wearer's nipples; and wherein nipple covers are attached to the ring-like mounts.

12. A brassiere according to claim 9 wherein the separation span includes an upper wire-like intermediate element which interconnects and forms a continuation of the upper frame sections, and a lower wire-like intermediate element which interconnects the lower marginal frame sections in downwardly spaced relation to the upper intermediate elements.

13. A brassiere according to claim 9 wherein the wire-like connecting elements are connected to and interconnect the lower marginal sections, the side sections, and the upper frame sections for reinforcing the lift-molds, 14. A brassiere according to claim 9 wherein the side sections of the frame turn forwardly in the provision of a gently contoured curve.

15. A brassiere according to claim 9 wherein the support means includes a back strap connected to the lower marginal sections and side sections of the frame.

16. A brassiere according to claim 14 wherein the support means includes a back strap connected to the lower marginal sections and side sections of the frame and shoulder straps connected to the gently contoured portion of the side sections.

17. A brassiere according to claim 9 in which the support means comprises side supports connected at their upper ends to the lower marginal sections of the frame and bearing against the wearer's hip bones at their lower ends, and means for holding the side supports against the wearer's body.

18. A brassiere according to claim 9 in which the frame is formed in first and second separable frame segments, said brassiere being further characterized by a spanner element interconnecting the frame segments for holding the frame segments and lift-molds in properly spaced relation on the wearer's body, and means associated with the spanner element for adjusting the distance between the frame segments.

19. A brassiere according to claim 9 wherein nipple covers are carried by the lift-molds and in which the nipple covers are detachable from the lift-molds.

20. A brassiere according to claim 9 wherein nipple covers are carried by the frame and in which the nipple covers comprise a plurality of petal-like elements which are biased into overlapping relation by the natural bias of the material from which they are formed, whereby the petal-like elements can fan out or contract to conform to the nipple area of the wearer.

21. A brassiere according to claim 9 and further characterized by upwardly and rearwardly extending brims carried by the frames and nipple covers for covering the upper portion of the wearer's breasts, the brims comprising a plurality of petal-like elements which are biased into overlapping relation by the natural bias of the material from which they are constructed whereby petal-like elements can fan out or contract to conform to the contour of breasts of varying fullnesses.

References Cited

UNITED STATES PATENTS

| | | | |
|---|---|---|---|
| 825,666 | 7/1906 | Kull | 128—463 |
| 2,391,417 | 12/1945 | Hill | 128—463 |
| 2,429,680 | 10/1947 | Goddard | 128—463 |
| 2,489,591 | 11/1949 | Saffady | 128—463 |
| 2,793,369 | 5/1957 | Panighini | 128—463 |

FOREIGN PATENTS 509,613  10/1952  Belgium.

ADELE M. EAGER, *Primary Examiner.*

U.S. Cl. X.R.

128—477.